United States Patent

Fletcher et al.

[11] 3,925,312
[45] Dec. 9, 1975

[54] POLYIMIDES OF ETHER-LINKED ARYL TETRACARBOXYLIC DIANHYDRIDES

[75] Inventors: James C. Fletcher, Administrator of the National Aeronautics and Space Administration, with respect to an invention of James A. Webster, Dayton, Ohio

[73] Assignee: The United States of America as represented by the Administrator of the National Aeronautics and Space Administration, Washington, D.C.

[22] Filed: July 11, 1974

[21] Appl. No.: 487,852

[52] U.S. Cl. ... 260/47 CP; 260/32.8 N; 260/32.6 N; 260/78 TF; 260/346.3; 260/571
[51] Int. Cl.² .......................................... C08G 73/10
[58] Field of Search ......... 260/47 CP, 78 TF, 346.2, 260/571

[56] References Cited
UNITED STATES PATENTS
3,649,601  3/1972  Critchley et al. .............. 260/78 TF
3,803,085  4/1974  Takehoshi et al. ............ 260/46.5 E Primary Examiner—Lester L. Lee
Attorney, Agent, or Firm—Wayland H. Riggins; L. D. Wofford, Jr.; John R. Manning

[57] ABSTRACT

Polyimides comprised of repeating units having the structure:

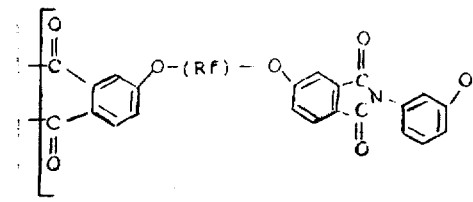

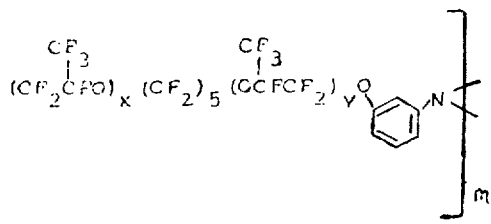

wherein Rf is perfluoralkylene having the structure $(CF_2)_n$ or a perfluoroalkylene ether having the structure $(CF_2)_m$—O—$(CF_2)_m$ wherein $n$ is an integer of 2 to 10, and $m$ is an integer of 1 to 10; $x$ and $y$ are each 0 to 3 and $x + y = 0$ to 5; and $m'$ is 1 to 100 have been found to possess improved thermal, oxidative and hydrolytic stability as well as improved physical and chemical characteristics that make it useful in a variety of applications including that of a sealant in advanced aerospace structures.

5 Claims, No Drawings

POLYIMIDES OF ETHER-LINKED ARYL TETRACARBOXYLIC DIANHYDRIDES

ORIGIN OF THE INVENTION

The invention described herein was made in the performance of work under a NASA contract and is subject to the provisions of Section 305 of the National Aeronautics and Space Act of 1958, Public Law 85-868 (72 STAT. 345; 42 U.S.C. 2457).

BACKGROUND OF THE INVENTION

1. Field of the Invention

The present invention relates to novel polyimides of improved chemical and physical properties and to a method for their preparation.

2. Description of the Prior Art

A very definite need has developed for materials useful in the preparation of sealants in advanced aerospace structures. The major requirement that such sealants must satisfy is the ability to maintain a seal within a fuel tank for an extended period of time, normally up to 25,000 hours, while subjected to a variety of adverse conditions. The conditions include exposure to high and low temperatures (−45°C to 260°C) in the presence of oxygen, hydrocarbon fuel and moisture. These conditions necessitate a high level of thermal, oxidative and hydrolytic stability. In addition, the sealant must also exhibit adequate physical and chemical characteristics including tensile strength and elasticity, good adhesion, and freedom from stress corrosion of titanium alloys. Needless to say the aforementioned requirements of sealants for aerospace are extraordinarily stringent and very few are known which meet the desired properties.

SUMMARY OF THE INVENTION

One object of the invention, therefore, is to provide polyimides exhibiting excellent thermal, oxidative and hydrolytic stability and high tensile strength and elongation during exposure to temperatures ranging from −45°C to 260°C.

Another object of the invention is to provide novel polyimides of improved fuel resistance, lowered glass transition temperature and improved high temperature capabilities.

Yet another object of the invention is to provide a method for the production of the novel polyimides of the invention.

These and other objects of the invention will become apparent from the following description and appended claims.

In accordance with the present invention, there are provided novel, normally solid, non-crosslinked polyimides comprised of repeating units having the structure:

wherein Rf is perfluoroalkylene having the structure $(CF_2)_N$ or a Perfluoroalkylene ether having the structure $(CF_2)_m-O-(CF_2)_m$ wherein $n$ is an integer of 2 to 10, preferably 4 to 6 and $m$ is an integer of 1 to 10, preferably 4 to 6; $x$ and $y$ are each 0 to 3 and $x + y = 0$ to 5, and $m'$ is generally 1 to 100.

The polyimides of the invention have been found to exhibit an extraordinarily high level of thermal, oxidative and hydrolytic stability. Solutions of the polyimides in organic solvents such as acetone or dimethylacetamide can be cast into films which exhibit high strength and elongation. Compression molding of the linear polymers has also been demonstrated.

If desired, a small proportion of a trifunctional crosslinking agent can be incorporated into the polyimides to impart high temperature mechanical stability and increased solvent resistance. The resulting crosslinked polyimides are found to exhibit high stability and appreciable tensile strength and elongation at temperatures as high as 300°C. In addition, the polyimides of the invention are characterized by high resistance to hydrocarbon fuels which makes them highly useful in the preparations of sealants for use in advanced aerospace structures.

DETAILED DESCRIPTION OF THE INVENTION

The novel polyimides of the invention may be prepared by condensation polymerization of an ether-linked aryl tetracarboxy dianhydride having the structure:

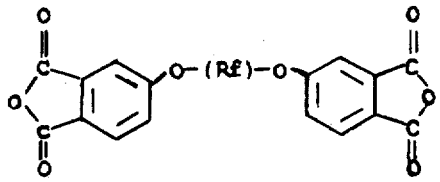

wherein Rf is a perfluoroalkylene having the structure $(CF_2)_n$ or a perfluoroalkylene ether having the structure $(CF_2)_m-O-(CF_2)_m$ wherein n is an integer of 2 to 10, preferably 4 to 6 and m is an integer of 1 to 10, preferably 4 to 6, with a diamine having the structure:

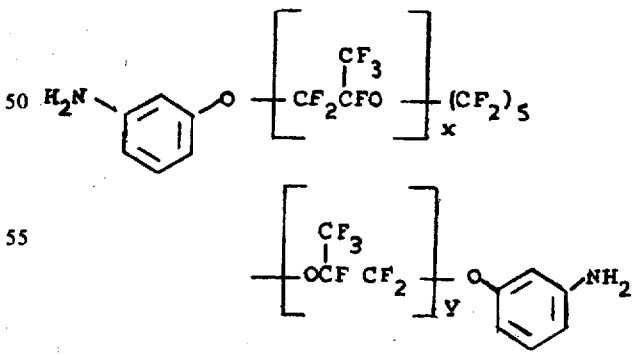

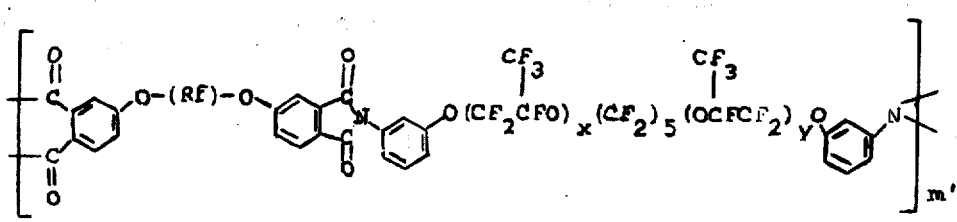

wherein $x$ and $y$ each = 0 to 3 and $x + y$ = 0 to 5.

Preparation of the polyimide polymers may be conducted in a conventional manner (e.g. as described in W. R. Sorenson and T. W. Campbell, "Preparative Methods of Polymer Chemistry", Interscience Pub. Sec. Ed., 1968, pp. 170) by the addition of the ether-linked aryl tetracarboxydianhydride to the diamine dissolved in a mutual solvent such as dimethylacetamide. The diamine and dianhydride reactants are employed in about stoichiometric proportions but small deviations from 1:1 proportions show little apparent changes in physical or chemical properties. The initial reaction at temperatures near ambient is the formation of a solution of polyamic acid. In general a reaction temperature of about 10° to 80°C. is employed. Formation of the fluorocarbon polyamic acids, however, takes place more slowly than with conventional polyimides, presumably because of the lower base strengths of the fluorocarbon aromatic diamines. We should not preclude acceleration of this reaction by heating to 30-80°C. An appreciable increase in solution viscosity becomes apparent only after stirring for over say 12 hours whereas with conventional polyimides a maximum viscosity is normally attained within a few hours. Evaporation of solvent and heating to about 150°C to 250°C results in condensation of the polyamic acid to the polyimide.

As aforementioned, if desired, a small proportion of a trifunctional crosslinking agent can be incorporated to impart high temperature mechanical stability and increased solvent resistance. Any of the conventional trifunctional crosslinking agents for polyimides can be employed. A particularly preferred crosslinking agent is mellitic trianhydride. When used the crosslinking agents are employed in amounts of about 2 to 20 equivalents percent preferably about 5 to 15 equivalents % based on the dianhydride employed in the polymerization.

The ether-linked aryl tetracarboxydianhydride reactant of the present invention may be prepared by a series of steps comprising reacting 3,4-bis(trifluoromethyl) phenol and a perfluoroalkanedioyl halide in a molar ratio of at least 2:1 to produce the corresponding 3,4-bis(trifluoromethyl)phenyl perfluoroalkanedioate. The 3,4-bis(trifluoromethyl phenyl perfluoroalkanedioate is then fluorinated to produce 3,3',4,4'-tetrakis (trifluoromethyl)-α,ω-diphenoxy polyfluoroalkane which is hydrolyzed to the corresponding tetracarboxylic acid. The tetracarboxylic acid thus produced is then dehydrated in the dianhydride reactant of the invention. The synthesis of the dianhydride reactant may be outlined as follows:

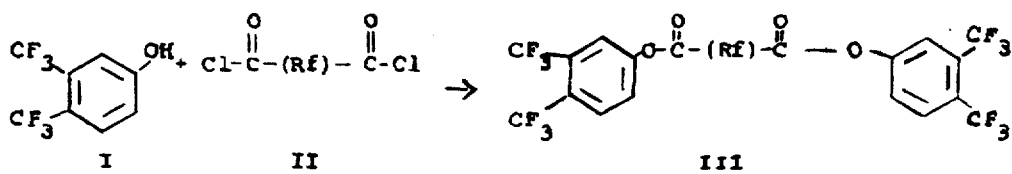

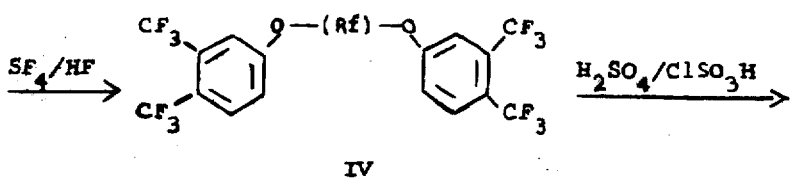

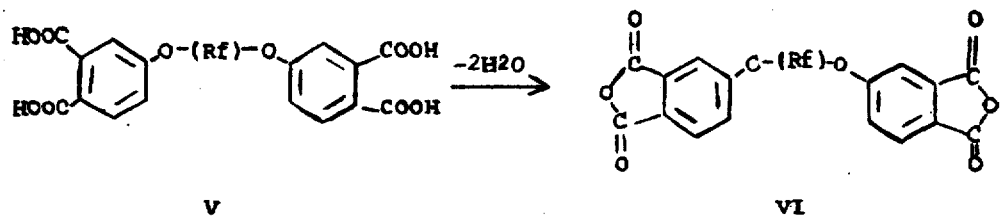

The perfluoroalkanedioyl halide reacted with the 3,4-bis-(trifluoromethyl) phenol may be any of the compounds having the structure:

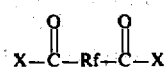

wherein Rf is as defined above and X is F, Cl or Br.

Examples of perfluoroalkanedioyl halides are perfluoromalonyl chloride, perfluorosuccinyl chloride, perfluoroglutaryl chloride, perfluoroadipoyl fluoride, etc. The reaction is ordinarily conducted in the presence of catalytic quantities of an aprotic amine catalyst such as pyridine at an elevated temperature, preferably about 75°C to 160°C using a molar ratio of 3,4-bis(trifluoromethyl) phenol to perfluoroalkanedioyl chloride of at least 2 to 1.

Fluorination of compound III, i.e. the 3,4-bis(trifluoromethyl) phenyl perfluoroalkanedioate is effected by conventional methods known to convert carboxyl groups to $CF_2$ groups. A convenient method comprises pressurizing an autoclave containing compound III with a stoichiometric excess of sulfur tetrafluoride in admixture with anhydrous hydrogen fluoride and heating the reactant mixture at 80°C – 85°C.

The hydrolysis of the resulting 3,3',4,4'-tetrakis(trifluoromethyl)-α,ω-diphenoxy polyfluoroalkane (Compound IV) is a preferential hydrolysis of the $CF_3$ groups on the aryl ring of compound IV without attack on a perfluoroalkoxy substituent.

This preferential hydrolysis may be effected by heating compound IV at temperatures of about 90°C to 120°C in the presence of a mixture of sulfuric acid and chlorosulfonic acid as a hydrolyzing agent.

Any of the conventional methods can be employed for conversion of the tetracarboxylic acid groups containing compound V into the dianhydride. A preferred procedure is to reflux compound V with excess acetic anhydride.

The following example will further illustrate preparation of the ether-linked aryl tetracarboxydianhydride reactant of the present invention.

EXAMPLE I

Preparation of Ether-linked Aryl Tetracarboxydianhydride 3,4-Bis(trifluoromethyl)phenol 3,4-Bis(trifluoromethyl)aniline (24 g, 0.15 mole) was dissolved in 120 ml of concentrated sulfuric acid. A solution prepared by dissolving sodium nitrite (12.0 g, 0.174 mole) in 120 ml of cold concentrated sulfuric acid was added to the amine over a period of 75 minutes. The temperature was then permitted to rise to 25°C and stirring was continued for 2 hours. The reaction mixture was then poured over excess ice and the resulting aqueous solution was steam distilled until 2 liters of distillate was collected. Extraction of this aqueous solution with ether and distillation of the extract afforded 19.3 g (80% yield) of 3,4-bis(trifluoromethyl)phenol, bp 116°C/50 torr, $\eta_D^{25}$ 1.4286.

3,4-Bis(trifluoromethyl)phenol Hexafluoroglutarate

Pyridine catalyzed reaction of 3,4-bis(trifluoromethyl)phenol (7.8 g, 0.034 mole) with perfluoroglutaryl chloride (4.7 g, 0.017 mole) at 75° to 120°C formed the corresponding diester in 90% yield, bp 155°C/0.15 torr, $\eta_D^{25}$ 1.4123-28.

3,3',4,4'-Tetrakis(trifluoromethyl)-1,5-diphenoxydecafluorpentane

A 300 stainless steel autoclave was charged with 8.0 g (0.012 mole) of 3,4-bis(trifluoromethyl)phenol hexafluoroglutarate, 38 g (1.9 moles) hydrogen fluoride and 24 g (0.22 mole) sulfur tetrafluoride. The autoclave was heated for 3 hr at 80°C and 21 hr at 85°C. The pressure was released after the autoclave had cooled and the contents was poured over ice and neutralized with $NaHCO_3$. The product was extracted with chloroform, washed with $NaHCO_3$. The product was extracted with chloroform, washed and dried. Distillation gave 8.5 g of product considered to be 3,3'4,4'-tetrakis(trifluoromethyl)-1,5-diphenoxydecafluoropentane, bp 115, 122°C/0.15 torr, $\eta_D^{25}$ 1.3895. Infrared analysis showed no carbonyl absorption.

1,5-Diphenoxydecafluoropentane-3',3'',4',4''-tetracarboxylic Acid

A mixture of 3',3'',4',4''-tetrakis(trifluoromethyl)-1,5-diphenoxy-decafluoropentane (28.5, 0.049 mole), 100% sulfuric acid (25 g, 0.25 mole), and chlorosulfonic acid (29 g, 0.25 mole) was heated with stirring in a flask under a condenser with dry nitrogen atmosphere. The temperature was held at 90°C for 48 hours, 100°C for 16 hours, and 120°C for 24 hours. During this time HCl evolved slowly. The mixture was then poured over ice, extracted with ether, washed and dried. Evaporation of ether left a brown gummy solid. This was dissolved in 300 ml water at 85°C, decolorized with charcoal, and filtered hot. Upon cooling, 19 g of white solid was collected by filtration, neut. equiv. found 160; calc'd. for tetracarboxylic acid, 153.

This product was refluxed with excess acetic anhydride and then devolatilized. Sublimation of the solid residue at 160°C/ 0.01 torr afforded 17.3 g of dianhydride, mp 94°–97°C (60% yield).

Attempts to purify the dianhydride further by recrystallization failed for lack of a suitable solvent. The anhydride (17.3) was finally dissolved in water and recrystallized as the acid, mp 145°–155°C, neut. equiv. 159. The acid was then recrystallized from 27% (by volume) acetic acid/water solution and a second time from 35% acetic acid solution. The melting point was raised to 151°–153° with very little loss in material. Neut. equiv. found 159, calc'd/ 153. NMR analysis showed an equal proportion of labile and aromatic protons suggesting that the tetracarboxylic acid crystallized as the monohydrate with a calculated equivalent weight of 157.5.

The above tetraacid was then converted once again to dianhydride and sublimed. Three fractions of sublimed material were collected.

| | Weight g | mp °C | Neut. Equiv. Found | Calc'd. |
|---|---|---|---|---|
| 1. | 4.4 | 97–99 | 145.5 | 144.0 |
| 2. | 6.5 | 97.5–99 | 146 | |
| 3. | 2.9 | 99–100 | — | |

Titration was carried out by dissolving in excess standard alkali and back titrating with acid. The infrared spectrum and elemental analysis substantiated the structure of the product.

| Analysis for $C_{21}H_6F_{10}O_8$ | C | H | F |
|---|---|---|---|
| Calc'd | 43.77 | 1.05 | 32.97 |
| Found | 43.53 | 0.96 | 33.10 |

Preparation of Diamine

The diamine reactant of the invention may be prepared by the $SF_4$ fluorination of the nitrophenyl ester of a perfluoroalkylene ether dicarboxylic acid, followed by catalytic reduction of the nitro groups at 40 psi hydrogen over Raney nickel to form the diamine. The synthesis may be represented as follows:

wherein x and y each = 0 to 3 and x + y = 0 to 5.

The polyamides prepared by the process of the invention have a variety of applications such as fuel tank sealants, matrix resins for composites, molding resins, films, etc.

The following examples are included to further illustrate the present invention.

EXAMPLE II

Preparation of Polyimide 1,5 Diphenoxydecafluoropentane-3′3″,4′4‴-tetracarboxylic acid dianhydride (0.144 g, 25 millimole) was added to (0.241 g, 25 millimole) of a diamine having the following structure:

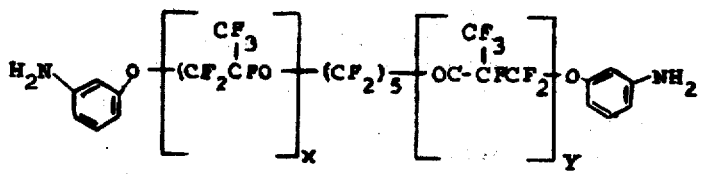

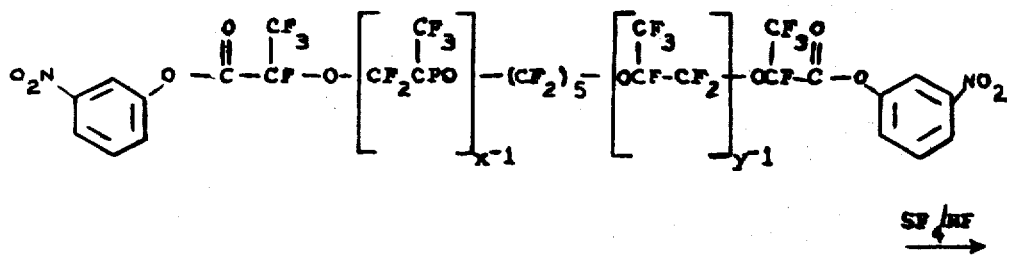

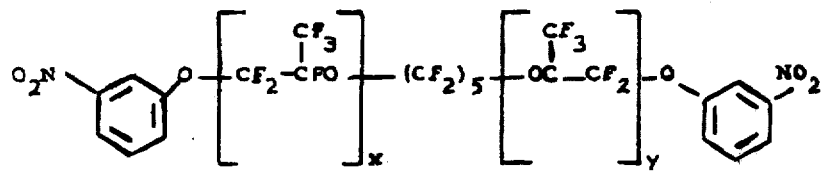

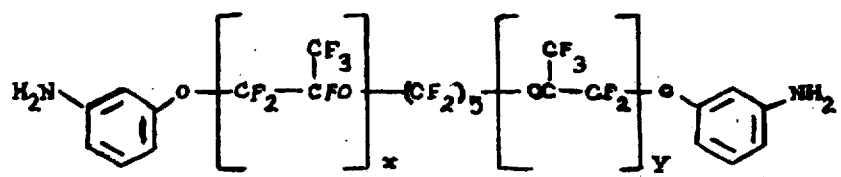

wherein x + y = 3 dissolved in 2 ml dimethylacetamide. The mixture was allowed to stir overnight (19 hr). The resulting viscous solution was poured into a film mold and warmed at 60 to 80°C to facilitate evaporation of solvent. The film of polyamic acid was then heated gradually (over several hours) to a temperature of 200°C. The resulting polyimide film exhibited high strength and elongation.

EXAMPLE III

Three different polyimide preparations designated A, B and C in the Table I below were prepared using the general procedure described in Example II except that about 10 equivalents % of the ether-linked dianhydride was replaced with mellitic trianhydride as a crosslinking agent. The polyamic acid solutions A & B were stirred 1 hour at 25°C before being poured into the film mold. Polyimide C contained a 2% excess of dianhydride over and above that required by stoichiometry. Each of the polyimides was subjected to cure by gradually raising the temperature to 200°C followed by an additional hour or more at 200°C.

The polyamides A, B and C thus prepared were subjected to tensile strength and elongation measurements which were determined using microtensile test specimens. The specimens were cut with the aid of a nonstandard die, similar in shape but smaller than that designated by ASTM procedure D-412-64I. The die dimensions, designated by the ASTM procedure as A, C, L, and W, were 8, 44, 17 and 2.6 mm. respectively.

The tensile strength measurements carried out using microtensile test specimens approximate but may differ from values obtained using standard tensile test specimens. The reported elongation values are based on crosshead travel because of the inability to use an extensiometer. If the length of the necked-down portion of the die is considered in gauge length, the results will be too high when appreciable elongation occurs within the entire length of the specimen, between the grips. On the other hand, inspection of elongated, cold drawn specimens showed that the elongation of some specimens occurred primarily within the necked-down portion. Because of this, maximum and minimum elongation values are shown in the Table. The maximum elongation results are based on the 17 mm gauge length, and minimum values are those based on 23 mm, the specimen length between grips. The results of the tests are summarized in the following Table I.

Table I

TENSILE STRENGTH AND ELONGATION OF POLYIMIDE $$\left[ \begin{array}{c} O \\ \parallel \\ C \\ | \\ C \\ \parallel \\ O \end{array} R \begin{array}{c} O \\ \parallel \\ C \\ | \\ C \\ \parallel \\ O \end{array} N \text{—} O\left(CF_2CFO\right)_x (CF_2)_5 \left(OCFCF_2\right)_y O \text{—} N \right]$$

$$\begin{array}{c} | \\ CF_3 \end{array} \qquad \begin{array}{c} | \\ CF_3 \end{array}$$

x + y = 3

| COMPOSITION | Composition (Equiv. Fraction of Reactants) | | |
|---|---|---|---|
| | Anhydride, R = O(CF$_3$)$_5$O | Amine x + y = 3 | Mellitic Trianhydride |
| A | 0.9 | 1.0 | 0.1 |
| B | 0.9 | 1.0 | 0.1 |
| C | 0.92 | 1.0 | 0.1 |

| COMPOSITION | Cure Temp. °C | Cure Time hr. | Test Temp. °C | Tensile Strength, psi | % Elongation (23 mm gauge) | % Elongation (17 mm gauge) |
|---|---|---|---|---|---|---|
| A | 200 | 4 | −43[3] | 5900 | 60 | 80 |
| | | | 25[2] | 5200 | 230 | 320 |
| | | | 288[2] | 165 | 70 | 100 |
| B | 200 | 1 | −43[2] | 7000 | 140 | 190 |
| | | | 25[2] | 8500 | 290 | 400 |
| | | | 288[2] | 190 | 50 | 65 |
| C | 190 | 66 | −43[2] | 7300 | 130 | 180 |
| | | | 25[3] | 6100 | 300 | 420 |
| | | | 288[2] | 130 | 50 | 70 |

[2] Two specimens
[3] Three specimens

The test date demonstrate the high tensile strength and elongation at elevated temperatures possessed by the crosslinked polyimides. The properties of polymer C prepared with 2% excess anhydride were not significantly different from polymer B.

EXAMPLE IV

The polyimide C was subjected to Chevron A-50 jet fuel under the conditions shown in Table II and the tensile strengths and elongations were determined before and after exposure. The results are set forth in Table II.

Table II

POLYIMIDE STABILITY

| Polymer Composition | Exposure Conditions | Tensile Strength, psi | Elongation, % (17 mm gauge) |
|---|---|---|---|
| C | none | 6100 | 420 |
| | 200 hr, 288°C, fuel vapor at 15 psi | 4500 | 810 |
| | 64 hr, 180°C, reflux fuel, air | 4400 | 730 |

Polymer C exposed to fuel vapor at atmospheric pressure for 200 hours at 288°C showed a significant increase in elongation with a moderate decrease in tensile strength. Similar properties were observed after a specimen of the polyimide was refluxed in fuel for 64 hours at 180°C while exposed to air.

EXAMPLE V

The adhesion of films of the polyimides of Example III to stainless steel and titanium metal were investigated. The metal specimens were cleaned and then coated with the polyimide polymer composition and cured at 180°C. The strips were then refluxed for 70 hours in Chevron A-50 jet fuel at 180°C under a nitrogen atmosphere for one example which was carried out in contact with air.

The results were good adhesion and resistance to refluxing jet engine fuel.

It is claimed:

1. A normally-solid polyimide consisting essentially of repeating units having the structure:

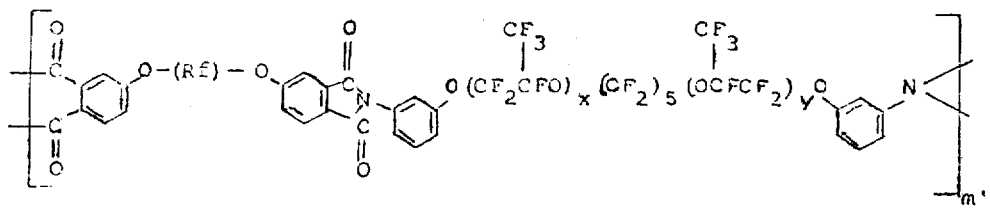

wherein Rf is perfluoroalkylene having the structure $-(CF_2)_n-$ or a perfluoroalkylene ether having the structure $-(CF_2)_m-O-(CF_2)_m-$ wherein $n$ is an integer of 2 to 10 and $m$ is an integer of 1 to 10; $x$ and $y$ are each 0 to 3 and $x + y = 0$ to 5; and $m'$ is 1 to 100.

2. The polyimide of claim 1 wherein Rf is $-(CF_2)_n-$ and $n$ is 4 to 6.

3. The polyimide of claim 2 wherein $n$ is 5.

4. The polyimide of claim 1 wherein the sum of $x + y$ is 3.

5. The polyimide of claim 1 crosslinked by reacting with mellitic trianhydride.

* * * * *